US006976169B1

(12) United States Patent
Takagi et al.

(10) Patent No.: US 6,976,169 B1
(45) Date of Patent: Dec. 13, 2005

(54) UNDENIABLE DIGITAL SIGNATURE SCHEME BASED ON QUADRATIC FIELD

(75) Inventors: Tsuyoshi Takagi, Duesseldorf (DE); Ingrid Biehl, Neunkirchen (DE); Sachar Paulus, Weinheim (DE)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1019 days.

(21) Appl. No.: 09/654,638

(22) Filed: Sep. 5, 2000

(51) Int. Cl.[7] .................................. H04L 9/00
(52) U.S. Cl. ...................................... 713/180
(58) Field of Search ............................... 713/155–156, 713/175–176, 180–181; 380/279, 282

(56) References Cited

U.S. PATENT DOCUMENTS 6,131,162 A * 10/2000 Yoshiura et al. ............ 713/176
6,550,011 B1 * 4/2003 Sims, III ..................... 713/193

OTHER PUBLICATIONS

Huhnlein; *A Cryptosystem Based On Non-Maximal Imaginary Quadratic Orders With Fast Decryption*; Advances in Cryptology-Eurocrypt '98, 1998, pp. 294-307.
Menezes; *Handbook of Applied Cryptography*; 1997, CRC Press, Boca Raton, Florida 33431.
Buchmann; *On the Complexity and Efficiency of a New Key Exchange System*; Advances in Cryptology—Eurocrypt '89; 1990, pp. 597-616.
Biehl; *Cryptographic Protocols Based on Discrete Logarithms in Real-Quadratic Orders*; Advances in Cryptology—Crypto '94, 1994, pp. 56-60.
Rivest; *Obtaining Digital Signatures and Public-Key Cryptosystems*, Communications of the ACM, Feb. 1978, vol. 21, #2, pp. 120-126.
Chaum; *Centre for Mathematics and Computer Science*, 1998, Springer-Verlag, pp. 212-214.

(Continued)

Primary Examiner—Gilberto Barron, Jr.
Assistant Examiner—Minh Dinh
(74) Attorney, Agent, or Firm—Brenda O. Holmes; Kilpatrick Stockton LLP

(57) ABSTRACT

An efficient undeniable digital signature scheme based on a quadratic field is disclosed. Public keys (D, P, k, t) and secret keys (D1, q) are defined by generating two primes p, q (p, q>4, p=3 mod 4, $\sqrt{p/3}<q$), computing D1= -p and D=D1q$^2$, obtaining a bit length k of $\sqrt{|D1|}/4$ and a bit length t of q-(D1/q) where (D1/q) denotes Kronecker symbol, and generating a kernel element P of a map from a class group Cl(D) to a class group Cl(D1). Then the signature verification is realized by first checking whether a norm N(S) of the signature S is smaller than k bits or not, and judging that the signature S is illegal when the norm N(S) is larger than k bits, or generating a challenge C when the norm N(S) is not larger than k bits, by computing the message ideal M of the message m, generating a random integer r smaller than t bits, computing H=(M/S)$^r$, generating a random ideal B whose norm is smaller than k-1 bits, and computing the challenge C=BH, at a verifier side; then computing a response W by mapping the challenge C to the class group Cl(D1) and pulling the mapped challenge C back to the class group Cl(D) and squaring a result of mapping and pulling back, using the secret keys (D1, q), at the signer side; and then checking whether W=B$^2$ holds or not, and judging that the signature S is legal when W=B$^2$ holds or that the signature S is illegal otherwise, at the verifier side.

10 Claims, 8 Drawing Sheets

OTHER PUBLICATIONS

Gennaro; *RSA-Based Undeniable Signatures*; 1998, Springer-Verlag, pp. 132, 149.

Shanks; *On Gauss and Composition 1*, Number Theory and Applications, pp. 163-204, 1989, Kluwer Academic Publishers.

*A Cryptosystem Based on Non-Maximal Imaginary Quadratic Orders with Fast Decryption*; Proceedings Eurocrypt '98; Mar. 1998, pp. 294-307.

*Conference on the Mathematics of Public Key Cryptography*; Jun. 12, 1999, pp. 1-17.

* cited by examiner

FIG.1

| Z | integer ring |
|---|---|
| D1 | fundamental discriminant(D1=-p, p=3 mod 4, p:prime) |
| q | conductor(q:prime) |
| D | non-fundamental discriminant(D=D1q$^2$) |
| $O_D$ | quadratic order with discriminant D($O_D$=Z+(D+$\sqrt{D}$)/2Z) |
| Cl(D) | class group with discriminant D |
| A | ideal in Cl(D) (A=(a, b)) |
| N(A) | norm of ideal A(N(A)=a, A=(a, b)) |

FIG.2

| Undeniable digital signature scheme of the present invention ||
|---|---|
| Secret keys | Fundamental discriminant D1, condoctor q |
| Public keys | Kernel element P, non-fund. discriminant D |
| Message | Message ideal M |
| Signature | S=GoToNonMaxOrder(GoToMaxOrder(M)) |
| Verification step 1 (verifier) | C=BH, (H=(M/S)$^r$, r<q) |
| Verification step 2 (signer) | W=(GoToNonMaxOrder(GoToMaxOrder(C)))$^2$ |
| Verification step 3 (verifier) | Check W=B$^2$ |

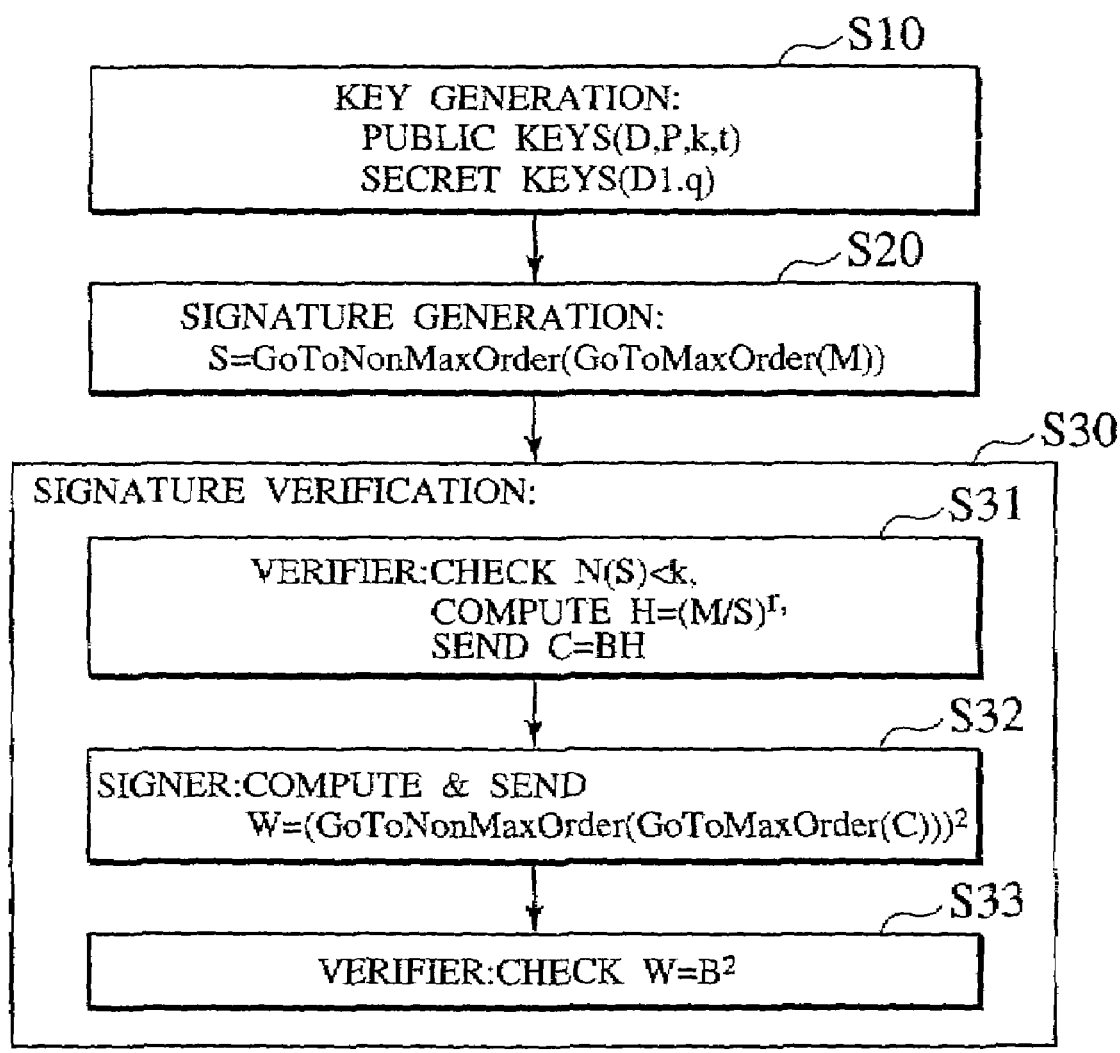

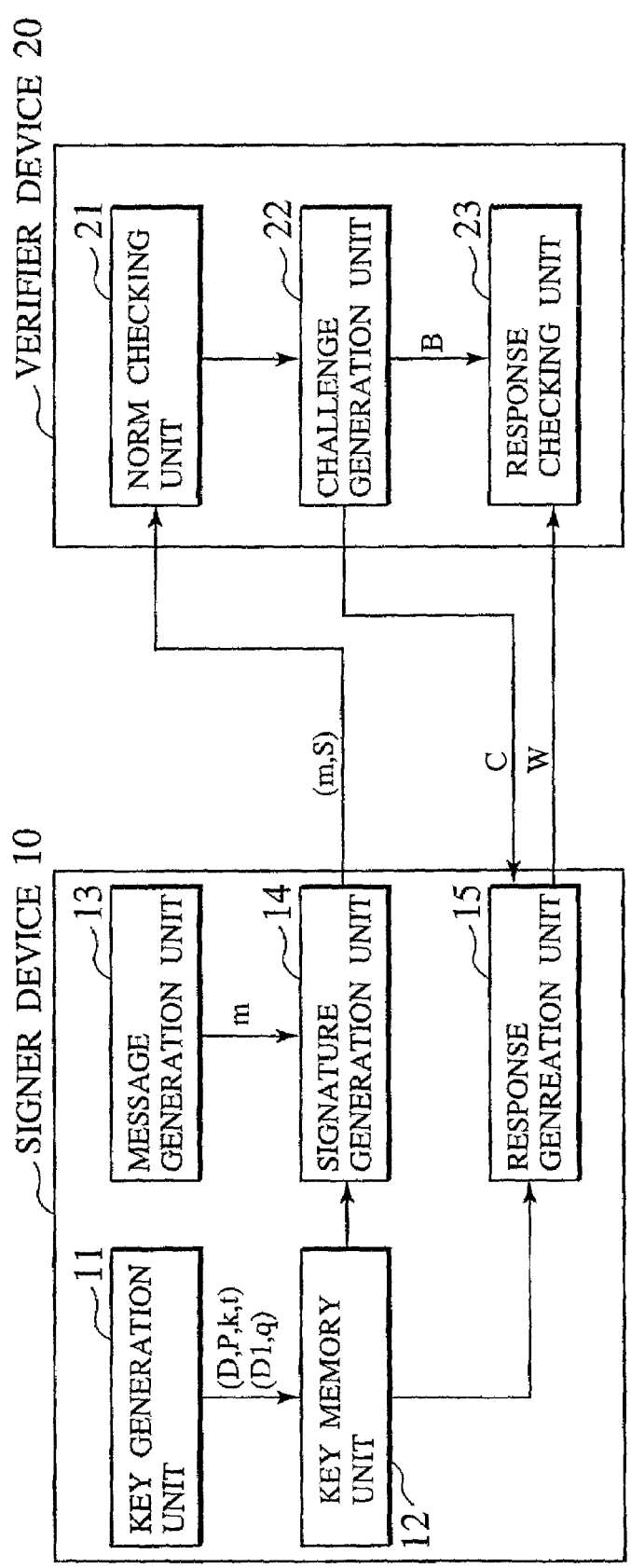

FIG.5

| Undeniable digital signature scheme of the present invention | | |
|---|---|---|
| Key generation | Fund. Disc. D1, conductor q | 1360.9ms |
| | Kernel element P, non-fund. Disc. D | 9.0ms |
| Message embedding | Message ideal M | 110.4ms |
| Signature generation | S=GoToNonMaxOrder(GoToMaxOrder(M)) | 1.9ms |
| Verifier Step 1(verifier) | C=BH, (H=(M/S)$^r$, r<q) | 2083.4ms |
| Verifier Step 2(signer) | W=(GoToNonMaxOrder(GoToMaxOrder(C))$^2$ | 7.7ms |
| Verifier Step 3(verifier) | Check W=B$^2$ | 4.2ms |

| Conventional RSA-type undeniable digital signature scheme | | |
|---|---|---|
| Key generation | p, q, (p<q, p=2p'+1, q=2p'+1) | (42min.) |
| | n, e, d, w, S$_w$(S$_w$=w$^d$ mod n) | 178.4ms |
| Message embedding | Generation of message m | 0.0ms |
| Signature generation | S$_m$=m$^d$ mod n | 177.2ms |
| Verifier Step 1(verifier) | Q=S$_m^i$S$_w^j$ mod n(i, j∈Z/nZ) | 350.2ms |
| Verifier Step 2(signer) | A=Q$^e$ mod n | 177.9ms |
| Verifier Step 3(verifier) | Check A=m$^i$w$^j$ mod n | 349.6ms |

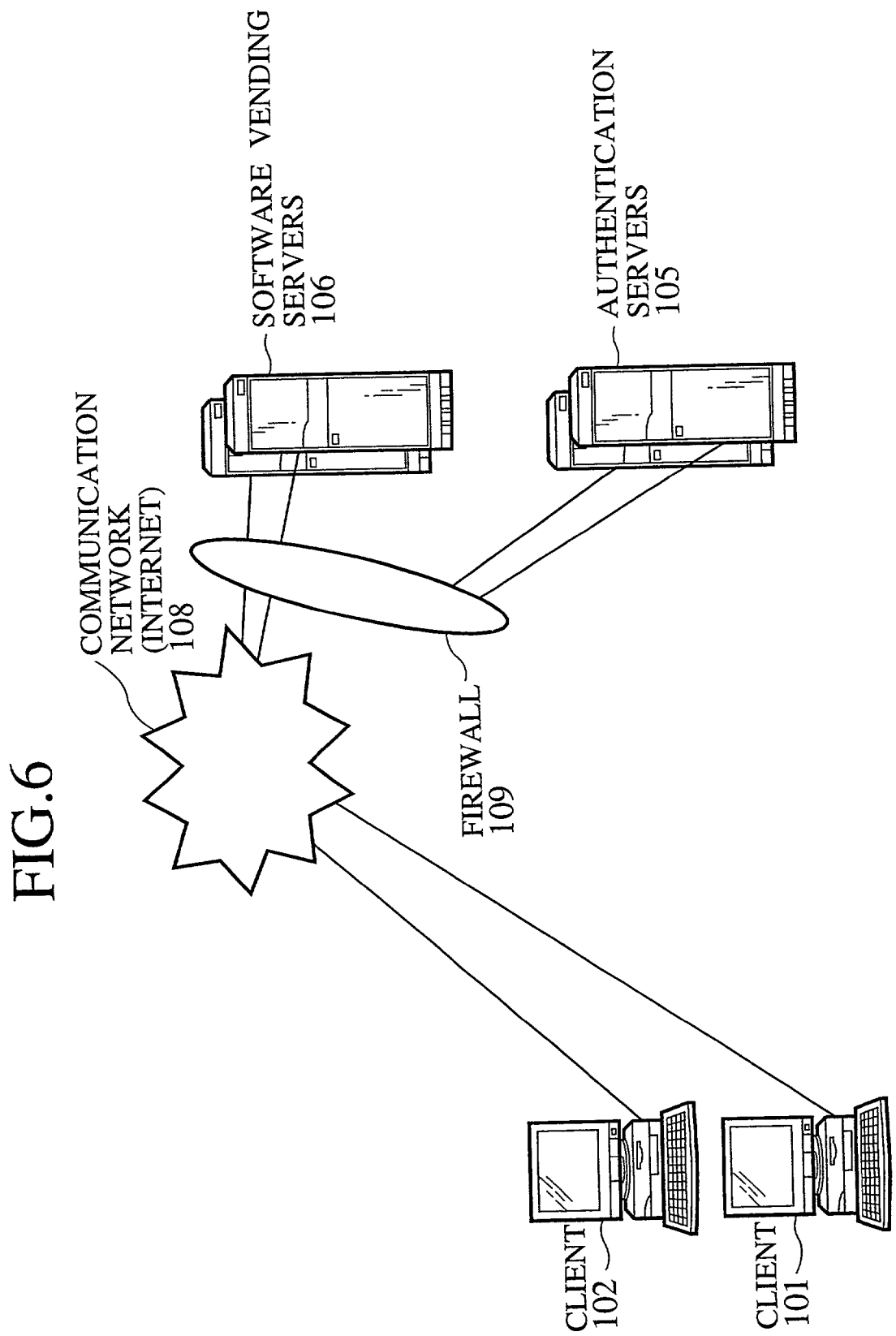

UNDENIABLE DIGITAL SIGNATURE SCHEME BASED ON QUADRATIC FIELD

BACKGROUND OF THE INVENTION

1. Field of the Invention

The present invention relates to an undeniable digital signature scheme which is a type of digital signature that can protect a privacy of a signer.

2. Description of the Background Art

In electronic communications, the digital signature technology is effective in checking the validity of data. The most widely used digital signature is the RSA signature that utilizes modular exponentiation calculations (see R. Rivest, A. Shamir and L. M. Adleman, "A method for obtaining digital signatures and public key cryptosystems", Communications of ACM, 21(2), pp. 120–126, 1978).

A digital signature scheme is evaluated by its security and its signature generation/verification speed, so that a digital signature scheme with a higher security and a faster computation speed is considered as superior. The security of the RSA signature is based on the intractability to compute the secret keys from public keys. A more secure system can be realized by making the key length of the public key longer. The RSA signature involves the modular exponentiation calculations that have great computational complexity so that there has been a drawback that the signature generation/verification requires a considerable amount of time.

As a variation of the digital signature, there has been a proposition of an undeniable signature (see D. Chaum and H. van Antwerpen, "Undeniable Signatures", Advances in Crypttology—CRTPTO'89, LNCS 435, pp. 212–216, Springer-Verlag, 1990). In the undeniable signature scheme, the legitimacy of the signature cannot be verified without communicating with a signer, so that the signature can be traced and the privacy of the signer can be protected. A standard application of the undeniable signature is a secure distribution of software, where a purchaser of the software can make a contact with a distributor who is also a signer and check that the software does not contain a virus entered by a third person.

The most efficient undeniable signature scheme to date is the RSA-based undeniable signatures (see R. Gennaro, H. Krawczyk and T. Rabin, "RSA-Based Undeniable Signatures", Advances in Cryptology—CRYPTO '89, LNCS 435, pp. 212–216, Springer-Verlag, 1990). This scheme is based on the RSA signature so that it is also associated with the problem of a large computational complexity.

In this regard, a smartcard has been attracting much attentions lately as an easily portable device for storing secret keys securely. However, a smartcard has limited computational resources so that a considerable time would be required to execute the RSA-based undeniable signature scheme on a smartcard. Moreover, in the case of using the undeniable signatures in a large scale information distribution system, there arises a problem of overloading the server. For these reasons, there has been demands for an efficient and high speed undeniable signature scheme.

SUMMARY OF THE INVENTION

It is therefore an object of the present invention to provide an undeniable digital signature scheme which is far more efficient compared with the conventional RSA-based undeniable signature scheme, and which is capable of resolving the problems associated with the conventional RSA-based undeniable signatures.

According to one aspect of the present invention there is provided a method of undeniable digital signature, comprising the steps of: (a) generating public keys (D, P, k, t) and secret keys (D1, q) at a signer side, by generating two primes p, q (p, q>4, p=3 mod 4, $\sqrt{p/3}<q$), computing $D1=-p$ and $D=D1q^2$, obtaining a bit length k of $\sqrt{|D1|}/4$ and a bit length t of $q-(D1/q)$ where $(D1/q)$ denotes Kronecker symbol, and generating a kernel element P of a map from a class group Cl(D) to a class group Cl(D1);

(b) generating a signature S for a message m at the signer side, by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D); and (c) verifying the signature S by: (c1) checking whether a norm N(S) of the signature S is smaller than k bits or not, and judging that the signature S is illegal when the norm N(S) is larger than k bits, or generating a challenge C when the norm N(S) is not larger than k bits, by computing the message ideal M of the message m, generating a random integer r smaller than t bits, computing $H=(M/S)^r$, generating a random ideal B whose norm is smaller than k−1 bits, and computing the challenge C=BH, at a verifier side; (c2) computing a response W by mapping the challenge C to the class group Cl(D1) and pulling the mapped challenge C back to the class group Cl(D) and squaring a result of mapping and pulling back, using the secret keys (D1, q), at the signer side; and (c3) checking whether $W=B^2$ holds or not, and judging that the signature S is legal when $W=B^2$ holds or that the signature S is illegal otherwise, at the verifier side.

According to another aspect of the present invention there is provided a signer device for processing an undeniable digital signature, comprising: a key generation unit for generating public keys (D, P, k, t) and secret keys (D1, q), by generating two primes p, q (p, q>4, p=3 mod 4, $\sqrt{p/3}<q$), computing $D1=-p$ and $D=D1q^2$, obtaining a bit length k of $\sqrt{|D1|}/4$ and a bit length t of $q-(D1/q)$ where $(D1/q)$ denotes Kronecker symbol, and generating a kernel element P of a map from a class group Cl(D) to a class group Cl(D1); a signature generation unit for generating a signature S for a message m, by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D); and a response generation unit for receiving a challenge C=BH from a verifier side, where B is a random ideal whose norm is smaller than k−1 bits, $H=(M/S)^r$, and r is a random integer smaller than t bits, computing a response W by mapping the challenge C to the class group Cl(D1) and pulling the mapped challenge C back to the class group Cl(D) and squaring a result of mapping and pulling back, using the secret keys (D1, q), and sending the response W to the verifier side, in a process for verifying the signature S.

According to another aspect of the present invention there is provided a verifier device for processing an undeniable digital signature, using a message m and a signature S received from a signer side, where public keys (D, P, k, t) and secret keys (D1, q) are defined by generating two primes p, q (p, q>4, p=3 mod 4, $\sqrt{p/3}<q$), computing $D1=-p$ and $D=D1q^2$, obtaining a bit length k of $\sqrt{|D1|}/4$ and a length t of $q-(D1/q)$ where $(D1/q)$ denotes Kronecker symbol, and generating a kernel element P of a map from a class group Cl(D) to a class group Cl(D1), and the signature S for the message m is generated by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D), the verifier device comprising: a norm checking unit for checking whether a norm N(S) of the signature S is smaller than k bits or not, and judging that the signature S is illegal when the norm N(S) is larger than k bits; a challenge generation unit for generating a challenge C when the norm N(S) is not larger than k bits, by computing the message ideal M of the message m, generating a random integer r smaller than t bits, computing $H=(M/S)^r$, generating a random ideal B whose norm is smaller than k−1 bits, and computing a challenge C=BH, and for sending the challenge C to a signer side; and a response checking unit for receiving a response W from the signer side, checking whether $W=B^2$ holds or not, and judging that the signature S is legal when $W=B^2$ holds or that the signature S is illegal otherwise, where the response W being obtained by mapping the challenge C to the class group Cl(D1) and pulling the mapped challenge C back to the class group Cl(D) and squaring a result of mapping and pulling back, using the secret keys (D1, q).

According to another aspect of the present invention there is provided a computer usable medium having computer readable program codes embodied therein for causing a computer to function as a signer device for processing an undeniable digital signature, the computer readable program codes including: a first computer readable program code for causing said computer to generate public keys (D, P, k, t) and secret keys (D1, q), by generating two primes p, q (p, q>4, p=3 mod 4, $\sqrt{p/3}<q$), computing D1=−p and D= $D1q^2$, obtaining a bit length k of $\sqrt{|D1|}/4$ and a bit length t of q−(D1/q) where (D1/q) denotes Kronecker symbol, and generating a kernel element P of a map from a class group Cl(D) to a class group Cl(D1); a second computer readable program code for causing said computer to generate a signature S for a message m, by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D); and a third computer readable program code for causing said computer to receive a challenge C=BH from a verifier side, where B is a random ideal whose norm is smaller than k−1 bits, $H=(M/S)^r$, and r is a random integer smaller than t bits, compute a response W by mapping the challenge C to the class group Cl(D1) and pulling the mapped challenge C back to the class group Cl(D) and squaring a result of mapping and pulling back, using the secret keys (D1, q), and send the response W to the verifier side, in a process for verifying the signature S.

According to another aspect of the present invention there is provided a computer usable medium having computer readable program codes embodied therein for causing a computer to function as a verifier device for processing an undeniable digital signature, using a message m and a signature S received from a signer side, where public keys (D, P, k, t) and secret keys (D1, q) are defined by generating two primes p, q (p, q>4, p=3 mod 4, $\sqrt{p-3}<q$), computing D1=−p and D=$D1q^2$, obtaining a bit length k of $\sqrt{|D1|}/4$ and a bit length t of q−(D1/q) where (D1/q) denotes Kronecker symbol, and generating a kernel element P of a map from a class group Cl(D) to a class group Cl(D1), and the signature S for the message m is generated by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D), the computer readable program codes including: a first computer readable program code for causing said computer to check whether a norm N(S) of the signature S is smaller than k bits or not, and judge that the signature S is illegal when the norm N(S) is larger than k bits; a second computer readable program code for causing said computer to generate a challenge C when the norm N(S) is not larger than k bits, by computing the message ideal M of the message m, generating a random integer r smaller than t bits, computing $H=(M/S)^r$, generating a random ideal B whose norm is smaller than k−1 bits, and computing the challenge C=BH, and send the challenge C to a signer side; and a third computer readable program code for causing said computer to receive a response W from the signer side, check whether $W=B^2$ holds or not, and judge that the signature S is legal when $W=B^2$ holds or that the signature S is illegal otherwise, where the response W being obtained by mapping the challenge C to the class group Cl(D1) and pulling the mapped challenge C back to the class group Cl(D) and squaring a result of mapping and pulling back, using the secret keys (D1, q).

According to another aspect of the present invention there is provided a method for providing a software vending service, comprising the steps of: (a) attaching an undeniable digital signature to a software offered for downloading by clients at a software vendor side, according to an undeniable digital signature scheme based on a quadratic field; and (b) carrying out a process of verifying the undeniable digital signature at the software vendor side interactively with each client which has downloaded the software with the undeniable digital signature attached thereto, so as to prove that the software has not been altered from an original.

According to another aspect of the present invention there is provided a method for enabling a user to check authenticity of an e-commerce/information service provider, comprising the steps of: (a) obtaining public keys, secret keys, and a signature for the public keys from a certificate authority at the e-commerce/information service provider, the signature being generated by the certificate authority according to an undeniable digital signature scheme; (b) providing the public keys and the signature from the e-commerce/information service provider to the user, such that the user carries out a process of verifying the signature provided from the e-commerce/information service provider to the user, interactively with the certificate authority to prove authenticity of the public keys provided by the e-commerce/information service provider; and (c) receiving an encrypted random data from the user, the encrypted random data being encrypted by the user using the public keys, decrypting the encrypted random data using the secret keys, and returning a decrypted random data to the user, such that the user checks if the decrypted random data coincides with an original random data to prove that the e-commerce/information service provider has authentic secret keys.

According to another aspect of the present invention there is provided a method for enabling a user to check authenticity of an e-commerce/information service provider, comprising the steps of: (a) issuing public keys, secret keys, and a signature for the public keys from a certificate authority to the e-commerce/information service provider, the signature being generated according to an undeniable digital signature scheme; and (b) carrying out a process of verifying the signature provided from the e-commerce/information service provider to the user, at the certificate authority interactively with the user in order to prove authenticity of the public keys provided by the e-commerce/information service provider.

According to another aspect of the present invention there is provided a method for enabling a user to check authenticity of an e-commerce/information service provider, comprising the steps of: (a) generating a signature for a hash value of a home page of the e-commerce/information service provider at a certificate authority according to an undeniable digital signature scheme; (b) posting the signature on a display of the home page of the e-commerce/information service provider at a user side from the certificate authority, such that the user can initiate a process of verifying the signature by clicking the signature on the display; and (c) carrying out the process of verifying the signature at the certificate authority interactively with the user in order to prove authenticity of the e-commerce/information service provider.

Other features and advantages of the present invention will become apparent from the following description taken in conjunction with the accompanying drawings.

BRIEF DESCRIPTION OF THE DRAWINGS

FIG. 1 is a table summarizing symbols used in describing a quadratic field that is utilized in the undeniable digital signature scheme according to the present invention.

FIG. 2 is a table summarizing parameters used in the undeniable digital signature scheme according to the present invention.

FIG. 3 is a flow chart showing a processing procedure of the undeniable digital signature scheme according to the present invention.

FIG. 4 is a block diagram showing exemplary configurations of a signer device and a verifier device for carrying out the processing procedure of FIG. 3.

FIG. 5 is a table summarizing a simulation result for comparing efficiency in the undeniable digital signature scheme according to the present invention and the conventional RSA-type digital signature scheme.

FIG. 6 is a schematic diagram showing an exemplary configuration of an undeniable digital signature system for a software vending service utilizing the undeniable digital signature scheme according to the present invention.

DETAILED DESCRIPTION OF THE PREFERRED EMBODIMENTS

Figure 7:
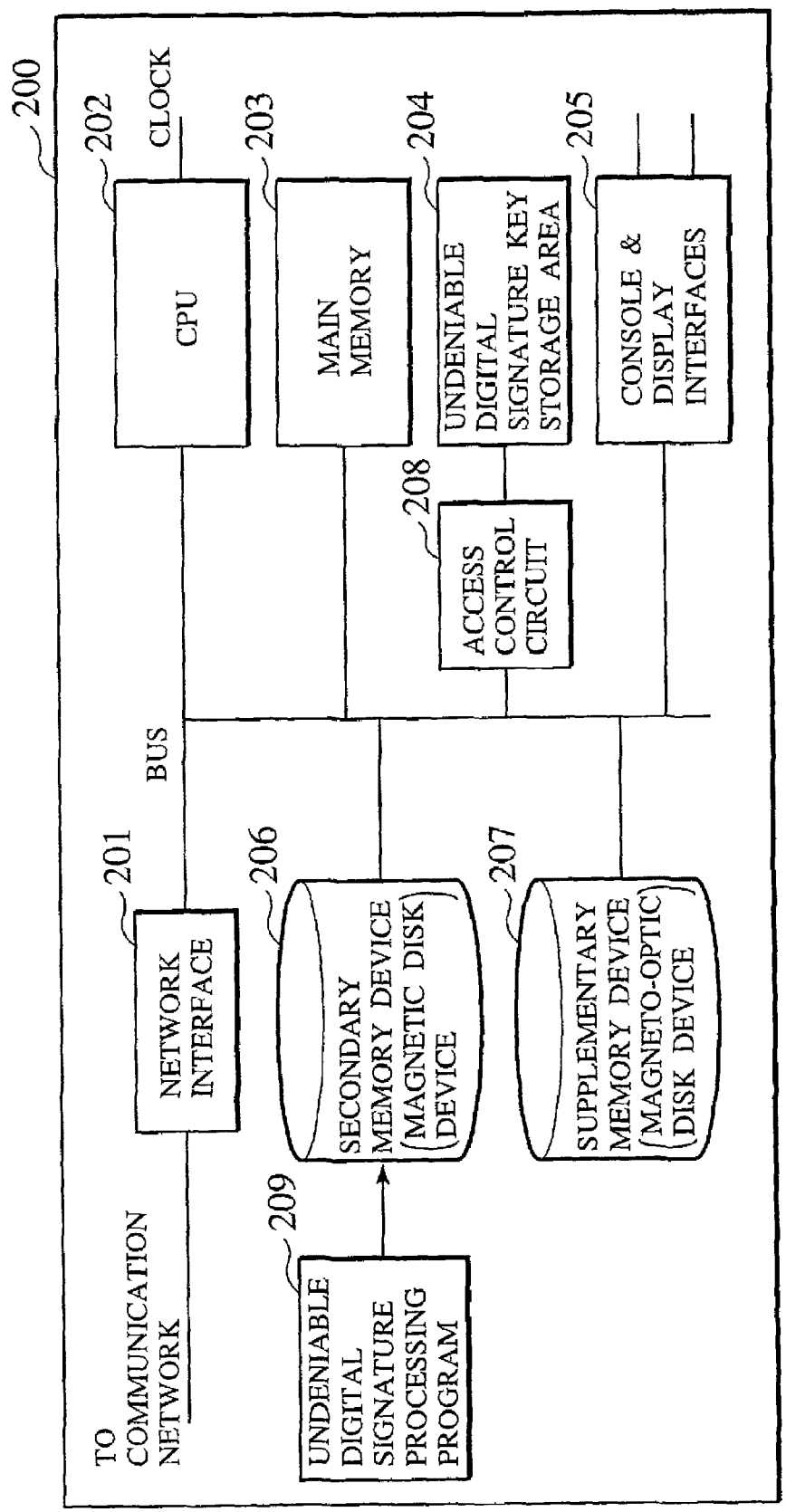
FIG. 7 is a block diagram showing an exemplary configuration of an authentication server in the undeniable digital signature system of FIG. 6.

Referring now to FIG. 1 to FIG. 9, one embodiment of the undeniable digital signature scheme according to the present invention will be described in detail.

The undeniable digital signature scheme of the present invention utilizes a structure of the class group of a quadratic field, especially fast algorithms for switching between the maximal order and the non-maximal order.

First, the property of a quadratic field utilized in this undeniable digital signature scheme will be summarized briefly.

Let p and q be two prime numbers greater than four that are given by $p=3 \mod 4$ and $\sqrt{p/3}<q$, and define $D1= -p$ and $D=D1q^2$, where $D1$ is a fundamental discriminant, $D$ is a non-fundamental discriminant, and q is a conductor. Denoting the integer ring by Z, $0_D=Z+(D+\sqrt{D})/2Z$ gives a quadratic order with discriminant D. The class group with discriminant D will be denoted as Cl(D). An ideal A in the class group Cl(D) is represented by A=(a, b) where "a" is a positive integer and "b" is an integer satisfying $b^2=D \mod 4a$. If $-a<b\leq a$ and $|b|\leq a \leq c=(b^2-D)/4a$, and assuming that $b\geq 0$ when a=c or a=|b|, then (a, b) can be uniquely determined for the ideal A. A norm of the ideal A will be denoted as N(A)=a where A=(a, b). The definitions of various symbols described above are summarized in a table shown in FIG. 1.

In the undeniable digital signature scheme of the present invention, there is a need to compute the modular exponentiation $A^r$ of an ideal A in the class group Cl(D). For this computation of the modular exponentiation $A^r$, it is possible to utilize the algorithms called "Multiply", "Square" and "Reduce" or their variant called "Square & Multiply" as disclosed in J. Buchmann, S. Duellmann and H. C. Williams, "On the complexity and efficiency of a new key exchange system", Advances in Cryptology—CRYPTO '89. LNCS 434, pp. 597–616, Springer-Verlag, 1990, or the algorithms called "NUCOMP" and "NUDUPL" as disclosed in D. Shanks, "On Gauss and Composition I, II", NATO ASI on Number Theory and Applications (R. A. Mollin, editor), pp. 163–204, Kluwer Academic Press, 1989.

Also, in the undeniable digital signature scheme of the present invention, the switching map between the class group of maximal order Cl(D1) and the class group of non-maximal order Cl(D) plays an important role. The computations for this switching map only involve easy calculations such as that of the greatest common divisor so that they can be done very fast. For this switching map, it is possible to utilize the algorithms called "GoToMaxOrder" and "GoToNonMaxOrder" as disclosed in D. Huehnlein, M. J. Jacobson, Jr., S. Paulus and T. Takagi, "A cryptosystem based on non-maximal imaginary quadratic orders with fast decryption", Advances in Cryptology—EUROCRYPT '98, LNCS 1403, pp. 294–307, Springer-Verlag, 1998.

Now, with references to FIG. 2 to FIG. 5, the processing of the undeniable digital signature scheme according to the present invention will be described in detail.

FIG. 2 summarizes parameters used in this undeniable digital signature scheme, FIG. 3 shows an overall processing procedure of this undeniable digital signature scheme, and FIG. 4 shows exemplary configurations of a signer device and a verifier device for carrying out the processing procedure of FIG. 3.

As shown in FIG. 3, this undeniable digital signature scheme generally comprises three major stages of a key generation (step S10), a signature generation (step S20) and a signature verification (step S30).

In the key generation stage, a key generation unit 11 of a signer device 10 carries out the following operation. Namely, two primes p, q (p, q>4, $p=3 \mod 4$, $\sqrt{p/3}<q$) are generated, and $D1=-p$ and $D=D1q^2$ are computed. Then, a bit length k of $\sqrt{|D1|}/4$ and a bit length t of $q-(D1/q)$ where (D1/q) denotes Kronecker symbol, are obtained. Also, a kernel element P of the map from the class group Cl(D) to the class group Cl(D1) is generated using the algorithm "KERNEL" described below. Here, the algorithm "KER- NEL" is used as an exemplary algorithm to generate a kernel element P(Cl(D)→Cl(D1)). Then, the public keys are defined as (D, P, k, t) while the secret keys are defined as (D1, q). The public keys (D, P, k, t) and the secret keys (D1, q) so obtained are stored in a key memory unit 12 of the signer device 10.

Note that the security of the quadratic field based cryptosystem that underlies this undeniable digital signature scheme depends on the intractability of calculating D1 and q from D which is the well known integer factorization problem. For further details, see D. Huehnlein, M. J. Jacobson, Jr., S. Paulus and T. Takagi, "A cryptosystem based on non-maximal imaginary quadratic orders with fast decryption", Advances in Cryptology—EUROCRYPT '98, LNCS 1403, pp. 294–307, Springer-Verlag, 1998.

In the signature generation stage, a signature generation unit 14 of the signer device 10 carries out the following operation. Namely, a message m generated by a message generation unit 13 is embedded into a message ideal M=(u, b) in the class group Cl(D) where a norm of the message ideal M is larger than k+1 bits, using the algorithm "Embedding" described below. Here, the algorithm "Embedding" is used as an exemplary algorithm to embed a message m into a message ideal M. Then, the signature S for the message ideal M is generated by S=GoToNonMaxOrder(GoToMaxOrder(M))

using the algorithms "GoToMaxOrder" and "GoToNonMaxOrder" described below, so as to obtain a pair (m, S) of the message and the signature. Here, the algorithms "GoToNonMaxOrder" and "GoToMaxOrder" are used as exemplary algorithms to map the ideal M to the class group Cl(D1) of the fundamental discriminant D1 and to pull the mapped ideal M back to the class group Cl(D) of the non-fundamental discriminant D. This pair (m, S) is then sent to the verifier.

The signature verification stage includes the following three steps.

A verification step I (step S31) is carried out by a norm checking unit 21 and a challenge generation unit 22 of a verifier device 20 as follows. First, whether a norm N(S) of the signature is smaller than k bits or not is checked by the norm checking unit 21. If it is larger than k bits, it implies that the signature is illegal. On the other hand, when it is not larger than k bits, the challenge generation unit 22 carries out the following operation. Namely, the message ideal M of the message m is computed using the algorithm "Embedding" described below. Then, a random integer r smaller than t bits is generated, and H= $(M/S)^r$ is computed. Next, a random ideal B whose norm is smaller than k−1 bits is generated using the algorithm "Embedding" described below, and C=BH is computed. This C is a challenge that is sent to the signer. Here, the algorithm "Embedding" is used as an exemplary algorithm to generate a random ideal B.

A verification step II (step S32) is carried out by a response generation unit 15 of the signer device 10 as follows. Namely, according to the secret keys (D1, q) stored in the key memory unit 12, the response generation unit 15 computes W=(GoToNonMaxOrder(GoToMaxOrder(C)))$^2$ using the algorithms "GoToMaxOrder" and "GoToNonMaxOrder" described below, and sends this W back to the verifier as a response. Here, the algorithms "GoToNonMaxOrder" and "GoToMaxOrder" are used as exemplary algorithms to map the ideal C to the class group Cl(D1) of the fundamental discriminant D1 and to pull the mapped ideal C back to the class group Cl(D) of the non-fundamental discriminant D.

A verification step III (step S33) is carried out by a response checking unit 23 of the verifier device 20 as follows. Namely, the response checking unit 23 checks whether W=$B^2$ holds or not. If it holds, then the signature is legal, whereas otherwise the signature is illegal.

It is to be noted that I. Biehl, S. Paulus and T. Takagi, "Efficient Undeniable Signature Schemes based on Ideal Arithmetic in Quadratic Orders", Conference on the Mathematics of Public Key Cryptography, June 1999, also discloses an undeniable digital signature scheme but this scheme is different from the undeniable digital signature scheme of the present invention in that the signature verification stage of this reference uses the Zero-Knowledge Protocol for $L_{k\ e\ r}$ which is far more complicated and time consuming than the algorithm used in the undeniable digital signature scheme of the present invention.

The algorithm "KERNEL" to generate a kernel element P(Cl(D)→Cl(D1)) is as follows.

```
Algorithm KERNEL
Input: fundamental discriminant D1, conductor q
Output: ideal P ∈ (Cl(D)→Cl(D1))
    1. /* Generate α = (x + y√D1)/2 */
        1.1. Generate integers x, y (<√D1)
    2. /* Standard representation of αO = (A, B) */
        2.1. Find integer (m, kn) such that
            m = ky + n(x + yD1)/2
        2.2. A ← |(x² − y² D1)|/4m²
        2.3. B ← (kx + n(x + y)D1/2)/m mod 2A, (−A ≦ B < A)
    3. /* Compute GoToNonMaxOrder(A) = (a, b) */
        3.1. a ← A
        3.2. b ← Bq mod 2A, (−a ≦ b < a)
    4. /* Reduce (a, b) */
        4.1. c ← (D − b²)/4a
        4.2. WHILE {−a < b ≦ a < c} or {0 ≦ b ≦ a = c} DO
            4.2.1. Find μ, λ such that −a ≦ μ = b + 2λa < a
            4.2.2. (a, b, c) ← (c − (b + μ)λ/2, μ, a)
        4.3. IF a = c AND b < 0 THEN b ← −b
        4.4. RETURN (a, b)
```

The algorithm "Embedding" to embed a message m into a message ideal M is as follows.

Algorithm Embedding
Input: non-fundamental discriminant D, message m smaller than k bits
Output: message ideal M∈Cl(D)
  1. Generate u which is a smallest quadratic residue among prime numbers larger than m
  2. Find b such that $b^2$=D mod 4u, (−u<b≦u)
  3. RETURN M=(u, b)

The algorithm "GoToNonMaxOrder" and "GoToMaxOrder" to map the ideal to the class group Cl(D1) of the fundamental discriminant D1 and to pull the mapped ideal back to the class group Cl(D) of the non-fundamental discriminant D are as follows.

Algorithm GoToNonMaxOrder
Input: reduced ideal (A, B)∈Cl(D1), conductor q
Output: reduced ideal (a, b)∈Cl(D) such that (a, b)=Ψ(v) where Ψ: Cl(D1)→Cl(D) and v is an element of Cl(D)
  1. a←A
  2. b←Bq mod 2a, (−a≦b<a)
  3. RETURN (a, b)

```
Algorithm GoToMaxOrder
Input: reduced ideal (a, b) ∈ Cl(D),
       fundamental discriminant D1, conductor q
Output: reduced ideal (A, B) ∈ Cl(D1) such that
       (A, B) = Φ(α) where Φ: Cl(D) → Cl(D1) and
       α is an element of Cl(D1)
```

-continued

1. /* Compute (A, B) = (a, b)$O_{D_1}$ */
   1.1. A ← a
   1.2. $b_0$ ← D mod 2
   1.3. Solve 1 = $\mu$q + $\lambda$a for $\mu, \lambda \in Z$
        using the extended Euclidean algorithm
   1.4. B ← b$\mu$ + a$b_0$ $\lambda$ mod 2a, (−A ≦ B < A)
2. /* Reduce (A, B) */
   2.1. C ← (D1 − $B^2$)/4A
   2.2. WHILE {−A < B ≦ A < C} or {0 ≦ B ≦ A = C} DO
        2.2.1. Find $\mu, \lambda \in Z$ such that −A ≦ $\mu$ = B + 2$\lambda$A < A
               using division with remainder
        2.2.2. (A, B, C) ← (C − (B + $\mu$)$\lambda$/2, $\mu$, A)
   2.3. IF A = C AND B < 0 THEN B ← −B
   2.4. RETURN (A, B)

In this undeniable digital signature scheme, the required amount of computations is small so that the signature verification can be done very fast even when the public keys are made very long.

To demonstrate the effectiveness of this undeniable digital signature scheme, this undeniable digital signature scheme and the conventional RSA-type undeniable digital signature scheme were implemented in form of software and the running times of each step in these two schemes were compared, for an exemplary case of using the bit length of the public key equal to 1024 bits. FIG. 5 summarizes the result of this simulation. As can be seen from FIG. 5, the key generation and the signature verification of the undeniable digital signature scheme of the present invention are much faster than those of the conventional RSA-type undeniable digital signature scheme.

Moreover, when the bit length of the public key is doubled, from 1024 bits to 2048 bits for example, the processing time of the undeniable digital signature scheme of the present invention becomes only twice longer, whereas the processing time of the conventional RSA-type undeniable digital signature scheme becomes about eight times longer.

Next, with references to FIG. 6 to FIG. 9, exemplary practical applications of the undeniable digital signature scheme according to the present invention will be described in detail.

FIG. 6 shows a schematic configuration of an undeniable digital signature system for a software vending service, which comprises clients 101 and 102 that are connected to a communication network 108 such as the Internet, and authentication servers 105 and software vending servers 106 that are connected to the communication network 108 through a firewall 109.

In this system, the authentication server 105 issues a secret key of the undeniable signature for the software vending server 106. The authentication server 105 also attaches a software vendor's undeniable digital signature to each software offered for downloading at the software vending server 106. When the client 101 or 102 downloads the software with the undeniable digital signature attached thereto from the software vending server 106, the client 101 or 102 can prove that the software has not been altered from an original (the software is not infected by any computer virus) by carrying out the process for verifying the undeniable digital signature interactively with the authentication server 105. Thus in this system the client 101 or 102 is the verifier and the authentication server 105 is the signer. In this way, it becomes possible to detect a downloaded software that is infected by any computer virus.

When the undeniable digital signature scheme according to the present invention is used in this system, the authentication server is only required to carry out the verification step II, which can be done very fast as already noted above, so that the processing load on the authentication server can be reduced considerably even in the case of a large scale system.

Furthermore, in the undeniable digital signature scheme of the present invention, a time required for the key generation is about 1 second which is much shorter than about 30 minutes required in the conventional RSA-type digital signature scheme. When the conventional RSA-type digital signature scheme is utilized in signing a large number of different softwares, it has been practically inevitable to use the same key many times because the key generation takes a rather long time. However, this use of the same key many times can be potentially problematic from a viewpoint of the security because, once the key used for one software is attacked somehow, the security of all the softwares for which the same key has been used is also lost. In this regard, in the undeniable digital signature scheme of the present invention, the key generation takes only a very short time so that there is no need to use the same key many times and it is possible to use each key only once so as to further improve the security.

In the system of FIG. 6, each authentication server can have an exemplary configuration as shown in FIG. 7, in which a network interface 201, a CPU (Central Processing Unit) 202, a main memory 203, an undeniable digital signature key storage area 204, console and display interfaces 205, a secondary memory device 206 such as a magnetic disk device, and a supplementary memory device 207 such as a magneto-optic disk device are interconnected through a bus. Here, the undeniable digital signature key storage area 204 is connected to the bus through an access control circuit 208, and an undeniable digital signature processing program 209 is stored in the secondary memory device 206.

Figure 8:
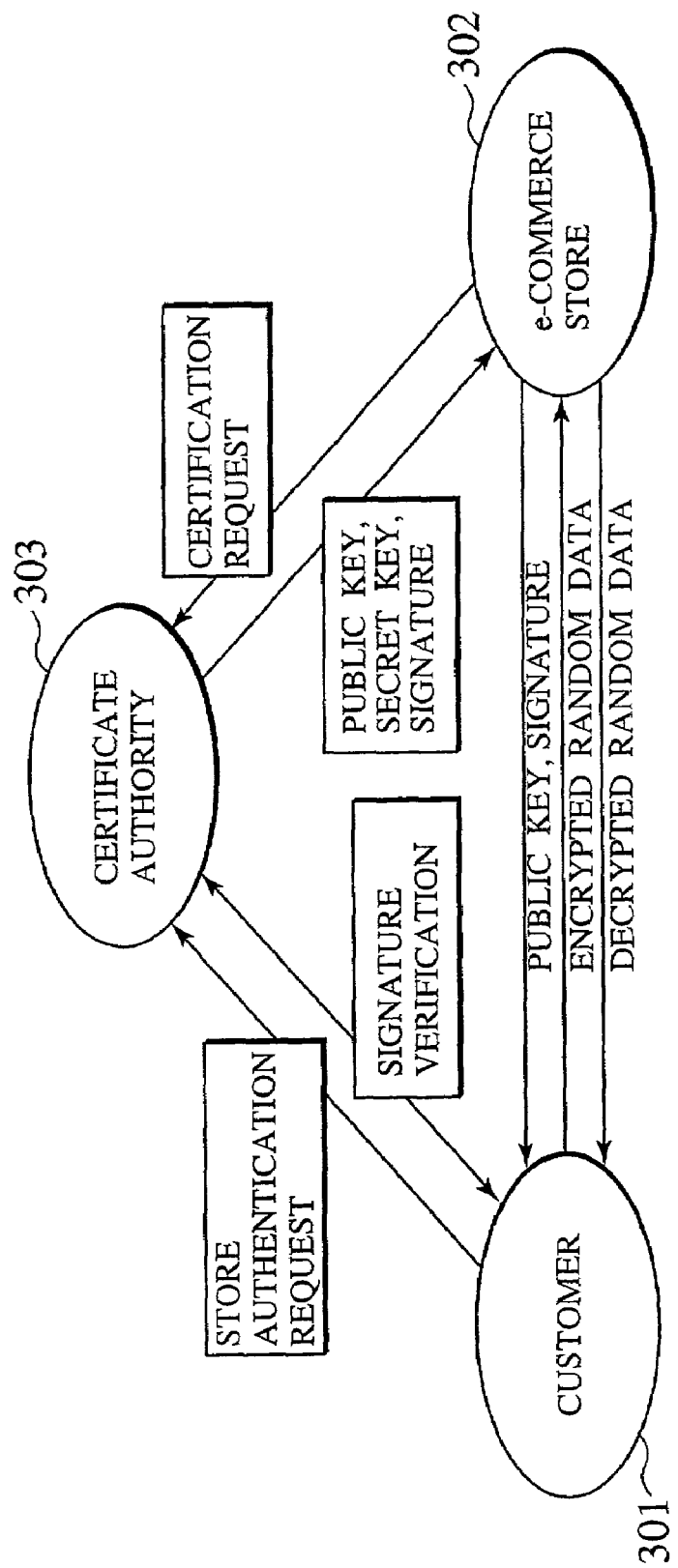
FIG. 8 is a schematic diagram showing an exemplary configuration of an undeniable digital signature system for an e-commerce service utilizing the undeniable digital signature scheme according to the present invention.

FIG. 8 shows a schematic configuration of an undeniable digital signature system for an e-commerce service.

In recent years, in conjunction with the rapid spread of the e-commerce on the Internet, troubles between customers and e-commerce stores are also increasing. For instance, there is a trouble of a product delivery failure despite of the proper payment made by the customer. In order to eliminate such troubles, it is effective for the e-commerce store to obtain a certificate issued by the trusted certificate authority and give this certificate to the customer at a time of purchase contract. Here, it is suitable to utilize the undeniable signature for the certificate so that the certificate cannot be reused illegally.

In this system of FIG. 8, an e-commerce store 302 makes a certification request to a certificate authority 303 in order to obtain a certificate. In response to this certification request, the certificate authority 303 tests the validity of the e-commerce store 302. If the e-commerce store 302 passes the test, the certificate authority 303 generates a pair of secret keys and public keys of a digital signature for the e-commerce store 302. The cetificate authority 303 also generates a signature for the public keys using the undeniable digital signature scheme of the present invention, and sends a set of the secret keys, the public keys, and the signature as a certificate to the e-commerce store 302.

Then, before purchasing a product from the e-commerce store 302, a customer 301 checks the authenticity of the e-commerce store 302 as follows. Namely, the customer 301 first obtains the public keys and the signature from the e-commerce store 302. Then, the customer 301 makes a store authentication request to the certificate autority 303. In response to this store authentication request, the signature verification of the undeniable digital signature is carried out by the certificate authority 303 as a signer and the customer 301 as a verifier. If the signature verification fails, it implies that the public keys are not authentic ones issued by the certificate authority 303 so that the customer 301 should not trust the e-commerce store 302.

On the other hand, if the signature verification succeeds, it implies that the public keys are authentic ones issued by the certificate authority 303. In this case, the customer 301 next generates a random data, encrypts it using the public keys of the e-commerce store 302, and sends the encrypted random data to the e-commerce store 302. In response, the e-commerce store 302 decrypts the encryted random number using the secret keys of the e-commerce store 302, and returns the decrypted random data to the customer 301. The customer 301 then checks if the decrypted random data coincides with the original random data. If they coincide, it implies that the e-commerce store 302 also has the authentic secret keys issued by the certificate authority 303 that corresponds to the public keys so that the customer 301 can regard the e-commerce store 302 as trustworthy and make a product purchase from the e-commerce store 302. In this way, it becomes possible to check the authenticity of the e-commerce service provider.

The above described procedure may be modified as follows.

Namely, in the system of FIG. 8, the e-commerce store 302 has a home page, and makes a certification request to the certificate authority 303 in order to obtain a certificate of the home page. In response to this certification request, the certificate authority 303 tests the validity of the e-commerce store 302. If the e-commerce store 302 passes the test, the certificate authority 303 generates a signature for the hash value of the home page using the undeniable digital signature scheme of the present invention, and posts the signature as a certificate on the home page of the e-commerce store 302 as displayed on the customer's browser. Here, the certificate is not directly issued to the e-commerce store 302 but made to appear on a display of the home page of the e-commerce store 302 on the customer's browser, so as to prevent an illegal copy of the certificate by the e-commerce store 302.

Then, before purchasing a product from the e-commerce store 302, the customer 301 checks the authenticity of the e-commerce store 302 as follows. Namely, the customer 301 clicks the certificate posted on the home page of the e-commerce store 302. In response, the signature is sent to the customer 301 and the customer 301 is linked to the certificate authority 303. Then, the signature verification of the undeniable digital signature is carried out by the certificate authority 303 as a signer and the customer 301 as a verifier. If the signature verification fails, it implies that the home page is not authentic one whose hash value is signed by the certificate authority 303 so that the customer 301 should not trust the e-commerce store 302. On the other hand, if the signature verification succeeds, the customer 301 can regard the e-commerce store 302 as trustworthy and make a product purchase from the e-commerce store 302. In this way, it also becomes possible to check the authenticity of the e-commerce service provider.

Figure 9:
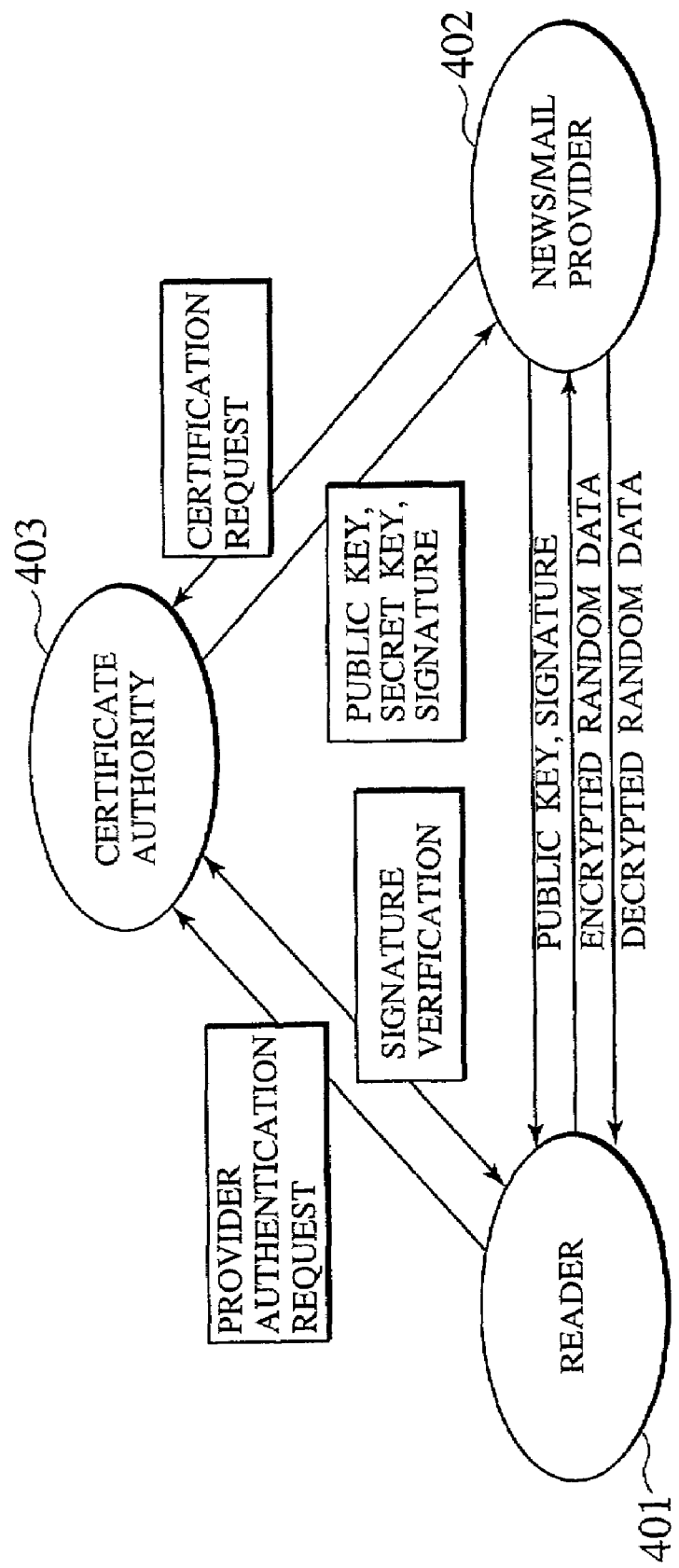
FIG. 9 is a schematic diagram showing an exemplary configuration of an undeniable digital signature system for a news/mail providing service utilizing the undeniable digital signature scheme according to the present invention.

FIG. 9 shows a schematic configuration of an undeniable digital signature system for a news/mail providing service.

In recent years, there are increasing threats of SPAM mails, a computer virus infection through mails or attached files, and a social disorder due to unreliable news. In order to eliminate such threats, the news/mail provider can attach an undeniable signature to the provided news/mails, such that the recipient can open/read the received news/mails only after checking the authenticity of the provider with the trusted certificate authority.

In this system of FIG. 9, a news/mail provider 402 makes a certification request to a certificate authority 403 in order to obtain a certificate. In response to this certification request, the certificate authority 403 tests the validity of the news/mail provider 402. If the news/mail provider 402 passes the test, the certificate authority 403 generates a pair of secret keys and public keys of a digital signature for the news/mail provider 402. The cetificate authority 403 also generates a signature for the public keys using the undeniable digital signature scheme of the present invention, and sends a set of the secret keys, the public keys, and the signature as a certificate to the news/mail provider 402.

Then, before opening news/mails received from the news/mail provider 402, a reader 401 checks the authenticity of the news/mail provider 402 as follows. Namely, the reader 401 first obtains the public keys and the signature from the news/mail provider 402. Then, the reader 401 makes a provider authentication request to the certificate autority 403. In response to this store authentication request, the signature verification of the undeniable digital signature is carried out by the certificate authority 403 as a signer and the reader 401 as a verifier. If the signature verification fails, it implies that the public keys are not authentic ones issued by the certificate authority 403 so that the reader 401 should not trust the news/mail provider 402.

On the other hand, if the signature verification succeeds, it implies that the public keys are authentic ones issued by the certificate authority 403. In this case, the reader 401 next generates a random data, encrypts it using the public keys of the news/mail provider 402, and sends the encrypted random data to the news/mail provider 402. In response, the news/mail provider 402 decrypts the encryted random number using the secret keys of the news/mail provider 402, and returns the decrypted random data to the reader 401. The reader 401 then checks if the decrypted random data coincides with the original random data. If they coincide, it implies that the news/mail provider 402 also has the authentic secret keys issued by the certificate authority 403 that corresponds to the public keys so that the reader 401 can regard the news/mail provider 402 as trustworthy and open the news/mails received from the news/mail provider 402. In this way, it becomes possible to check the authenticity of the information service provider.

The above described procedure may be modified as follows.

Namely, in the system of FIG. 9, the news/mail provider 402 has a home page, and makes a certification request to the certificate authority 403 in order to obtain a certificate of the home page. In response to this certification request, the certificate authority 403 tests the validity of the news/mail provider 402. If the news/mail provider 402 passes the test, the certificate authority 403 generates a signature for the hash value of the home page using the undeniable digital signature scheme of the present invention, and posts the signature as a certificate on the home page of the news/mail provider 402 as displayed on the reader's browser. Here, the certificate is not directly issued to the news/mail provider 402 but made to appear on a display of the home page of the news/mail provider 402 on the reader's browser, so as to prevent an illegal copy of the certificate by the news/mail provider 402.

Then, before opening news/mails received from the news/mail provider 402, the reader 401 checks the authenticity of the news/mail provider 402 as follows. Namely, the reader 401 clicks the certificate posted on the home page of the news/mail provider 402. In response, the signature is sent to the reader 401 and the reader 401 is linked to the certificate authority 403. Then, the signature verification of the undeniable digital signature is carried out by the certificate authority 403 as a signer and the reader 401 as a verifier. If the signature verification fails, it implies that the home page is not authentic one whose hash value is signed by the certificate authority 403 so that the reader 401 should not trust the news/mail provider 402. On the other hand, if the signature verification succeeds, the reader 401 can regard the news/mail provider 402 as trustworthy and open the news/mails rewceived from the news/mail provider 402. In this way, it also becomes possible to check the authenticity of the e-commerce service provider.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the signer device and the verifier device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of processing an undeniable digital signature, comprising the steps of:
    (a) generating public keys (D, P, k, t) and secret keys (D1, q) at a signer side, by generating two primes $$p, q\left(p, q > 4, p = 3 \bmod 4, \sqrt{\frac{P}{3}} < q\right),$$

computing D1=−p and D= D1q², obtaining a bit length k of $$\frac{\sqrt{|D1|}}{4}$$

and a bit length t of q−(D1/q) where (D1/q) denotes Kronecker symbol, and generating a kernel element P of a map from a class group Cl(D) to a class group Cl(D1);
    (b) generating a signature S for a message m at the signer side, by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D); and
    (c) verifying the signature S by:
        (c1) checking whether a norm N(S) of the signature S received from the signer side is smaller than k bits or not, and judging that the signature S is illegal when the norm N(S) is larger than k bits, or generating a challenge C when the norm N(S) is not larger than k bits, by computing the message ideal M of the message m, generating a random integer r smaller than t bits, computing H=(MS)ʳ, generating a random ideal B whose norm is smaller than k−1 bits, and computing the challenge C=BH, at a verifier side;
        (c2) computing a response W by mapping the challenge C received from the verifier side to the class group Cl(D1) and pulling the mapped challenge C back to the class group Cl(D) and squaring a result of mapping and pulling back, using the secret keys (D1, q), at the signer side; and
        (c3) checking whether W=B² holds or not by using the response W received from the signer side, and judging that the signature S is legal when W=B² holds or that the signature S is illegal otherwise, at the verifier side.

2. A signer device for processing an undeniable digital signature, the signer device implemented using a computer, comprising:
    a key generation unit for generating public keys (D, P, k, t) and secret keys (D1, q), by generating two primes p, q (p, q>4, p=3 mod 4, $$p, q\left(p, q > 4, p = 3 \bmod 4, \sqrt{\frac{P}{3}} < q\right),$$

computing D1=−p and D=D1q², obtaining a bit length k of $$\frac{\sqrt{|D1|}}{4}$$

and a bit length t of q−(D1/q) where (D1/q) denotes Kronecker symbol, and generating a kernel element P of a map from a class group Cl(D) to a class group Cl(D1);
    a signature generation unit for generating a signature S for a message m, by embedding the message m into a message ideal M in the class group Cl(D) where a norm of the message ideal M is larger titan k+1 bits, and mapping the message ideal M to the class group Cl(D1) and pulling the mapped message ideal M back to the class group Cl(D); and
    a response generation unit for receiving a challenge C=BH from a verifier side, where B is a random ideal whose norm is smaller than k−1 bits, H=(M/S)ʳ, and r is a random integer smaller than t bits, computing a response W by mapping the challenge C to the class group Cl(D1) and pulling the mapped challenge C back to the class group Cl(D) and squaring a result of mapping and pulling back, using the secret keys (D1, q), and sending the response W to the verifier side, in a process for verifying the signature S.

3. A verifier device for processing an undeniable digital signature, using a message m and a signature S for the message m received from a signer side, the verifier device implemented using a computer, where public keys (D, P, k, t) and secret keys (D1, q) are defined by generating two primes p, q (p, q>4, p=3 mod 4, $$p, q\left(p, q > 4, p = 3 \bmod 4, \sqrt{\frac{p}{3}} < q\right),$$

computing D1=−p and D=D1q², obtaining a bit length k of $$\frac{\sqrt{|DI|}}{4}$$

and a bit length t of q−(D1/q) where (D1/q) denotes Kronecker symbol, and generating a kernel element P of a map from a class group Cl(D) to a class group Cl(D1), and the signature S is generated by embedding site message m into a message ideal M in the class group Cl(D) where a norm of the message ideal M is larger than k+1 bits, and mapping the message ideal M to the class group Cl(D1) and pulling the mapped message ideal M back to the class group Cl(D), the verifier device comprising:
- a norm checking unit for checking whether a norm N(S) of the signature S is smaller than k bits or not, and judging that the signature S is illegal when the norm N(S) is larger thank k bits;
- a challenge generation unit for generating a challenge C when the norm N(S) is not larger than k bits, by computing the message ideal M of the message m, generating a random integer r smaller than t bits, computing H=(M/S)ʳ, generating a random ideal B whose norm is smaller than k−1 bits, and computing a challenge C=BH, and for sending the challenge C to the signer side; and
- a response checking unit for receiving a response W from the signer side, checking whether W=B² holds or not, and judging that the signature S is legal when W=B² holds or that the signature S is illegal otherwise, where the response W being obtained by mapping the challenge C to the class group Cl(D1) and pulling the mapped challenge C back to the class group Cl(D) and squaring a result of mapping and pulling back, using the secret keys (D1, q).

4. A computer usable medium having computer readable program codes embodied therein for causing a computer to function as a signer device for processing an undeniable digital signature, the computer readable program codes including:
- a first computer readable program code for causing said computer to generate public keys (D, P, k, t) and secret keys (D1, q), by generating two primes p, q (p, q>4, p=3 mod 4, $$\sqrt{\frac{p}{3}}$$

computing D1=−p and D=D1q², obtaining a bit length k of $$\frac{\sqrt{|DI|}}{4}$$

and a bit length t of q−(D1/q) where (D1/q) denotes Kronecker symbol, and generating a kernel element P of a map from a class group Cl(D) to a class group Cl(D1);
- a second computer readable program code for causing said computer to generate a signature S for a message m, by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D); and
- a third computer readable program code for causing said computer to receive a challenge C=BH from a verifier side, where B is a random ideal whose norm is smaller than k−1 bits, H=(M/S)ʳ, and r is a random integer smaller than t bits, compute a response W by mapping the challenge C to the class group Cl(D1) and pulling the mapped challenge C back to the class group Cl(D) and squaring a result of mapping and pulling back, using the secret keys (D1, q), and send the response W to the verifier side, in a process for verifying the signature S.

5. A computer usable medium having computer readable program codes embodied therein for causing a computer to function as a verifier device for processing an undeniable digital signature, using a message m and a signature S received from a signer side, where public keys (D, P, k, t) and secret keys (D1, q) are defined by generating two primes p, q (p, q>4, p=3 mod 4, $$p, q\left(p, q > 4, p = 3 \bmod 4, \sqrt{\frac{p}{3}} < q\right),$$

computing D1=−p and D= D1q², obtaining a bit length k of $$\frac{\sqrt{|DI|}}{4}$$

and a bit length t of q−(D1/q) where (D1/q) denotes Kronecker symbol, and generating a kernel element P of a map from a class group Cl(D) to a class group Cl(D1), and the signature S for the message m is generated by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D), the computer readable program codes including:
- a first computer readable program code for causing said computer to check whether a norm N(S) of the signature S is smaller than k bits or not, and judge that the signature S is illegal when the norm N(S) is larger than k bits;
- a second computer readable program code for causing said computer to generate a challenge C when the norm N(S) is not larger than k bits, by computing the message ideal M of the message m, generating a random integer r smaller than t bits, computing $H=(M/S)^r$, generating a random ideal B whose norm is smaller than k−1 bits, and computing the challenge C=BH, and send the challenge C to the signer side; and a third computer readable program code for causing said computer to receive a response W from the signer side, check whether $W=B^2$ holds or not, and judge that the signature S is legal when $W=B^2$ holds or that the signature S is illegal otherwise, where the response W being obtained by mapping the challenge C to the class group Cl(D1) and pulling the mapped challenge C back to the class group Cl(D) and squaring a result of mapping and pulling back, using the secret keys (D1, q).

6. A method for providing a software vending service, comprising the steps of:
- (a) attaching a signature S to a software offered for downloading by clients at a software vendor side, according to an undeniable digital signature scheme, wherein the step (a) further includes the steps of:
  - (a1) generating public keys (D, P, k, t) and secret keys (D1, q) at the software vendor side, by generating two primes p, q (p, q>4, p=3 mod 4, $$p, q\left(p, q > 4, p = 3 \bmod 4, \sqrt{\frac{p}{3}} < q\right),$$

computing D1= −p and D=D1q², obtaining a bit length k of $$\frac{\sqrt{|D1|}}{4}$$

and a bit length t of q−(D1/q) where (D1/q) denotes Kronecker symbol, and generating a kernel element P of a map from a class group Cl(D) to a class group Cl(D1); and
  - (a2) generating the signature S for a message m representing the software at the software vendor side, by embedding the message m into a message ideal M in the class group Cl(D) where a norm of the message ideal M is larger than k+1 bits, and mapping the message ideal M to the class group Cl(D1) and pulling the mapped message ideal M back to the class group Cl(D); and,
- (b) verifying the signature S a client side which has downloaded the software with the signature S attached thereto interactively with the software vendor side, so as to prove that the software has not been altered from an original, wherein the step (b) further includes the steps of:
  - (b1) checking whether a norm N(S) of the signature S received from the software vendor side is smaller than k bits or not, and judging that the signature S is illegal when the norm N(S) is larger than k bits, or generating a challenge C when the norm N(S) is not larger than k bits, by computing the message ideal M of the message m, generating a random integer r smaller than t bits, computing $H=(M/S)^r$, generating a random ideal B whose norm is smaller than k−1 bits, and computing the challenge C=BH, at the client side;
  - (b2) computing a response W by mapping the challenge C received from the client side to the class group Cl(D1) and pulling the mapped challenge C back to the class group Cl(D) and squaring a result of mapping and pulling back, using the secret keys (D1, q), at the software vendor side; and
  - (b3) checking whether $W=B^2$ holds or not by using the response W received from the software vendor side, and judging that the signature S is legal when $W=B^2$ holds or that the signature S is illegal otherwise, at the client side.

7. The method of claim 6, wherein the step (a) attaches the signature S using different sets of public keys and secret keys for different kinds of software.

8. A method for enabling a user side to check authenticity of an e-commerce/information service provider, comprising the steps of:
- (a) obtaining public keys (D, P, k, t), secret keys (D1, q), and a signature S for the public keys from a certificate authority side at the e-commerce/information service provider, the signature being generated by the certificate authority side according to an undeniable digital signature scheme, wherein the step (a) further includes the steps of:
  - (a1) generating the public keys and the secret keys at the certificate authority side, by generating two primes p, q (p, q>4, p=3 mod 4, $$p, q\left(p, q > 4, p = 3 \bmod 4, \sqrt{\frac{p}{3}} < q\right),$$

computing D1=−p and D=D1q², obtaining a bit length k of $$\frac{\sqrt{|D1|}}{4}$$

and a bit length t of q−(D1/q) where (D1/q) denotes Kronecker symbol, and generating a kernel element P of a map from a class group Cl(D) to a class group Cl(D1); and
  - (a2) generating the signature S for the public keys at the certificate authority side, by embedding the public keys into a message ideal M in the class group Cl(D) where a norm of the message ideal M is larger than k+1 bits, and mapping the message ideal M to the class group Cl(D1) and pulling the mapped message ideal M back to the class group Cl(D);
- (b) providing the public keys and the signature S from the e-commerce/information service provider to the user side, such that the user side carries out a process of verifying the signature S provided from the e-commerce/information service provider to the user side, interactively with the certificate authority side to prove authenticity of the public keys provided by the e-commerce/information service provider, wherein the step (b) further includes the steps of:
  - (b1) checking whether a norm N(S) of the signature S received from the certificate authority side is smaller than k bits or not, and judging that the signature S is illegal when the norm N(S) is larger than k bits, or generating a challenge C when the norm N(S) is not larger than k bits, by computing the message ideal M of the public keys, generating a random integer r smaller than t bits, computing $H=(M/S)^r$, generating a random ideal B whose norm is smaller than k−1 bits, and computing the challenge C=BH, at the user side;

(b2) computing a response W by mapping the challenge C received from the user side to the class group Cl(D1) and pulling the mapped challenge C back to the class group Cl(D) and squaring a result of mapping and pulling back, using the secret keys (D1, q), at the certificate authority side; and (b3) checking whether $W=B^2$ holds or not by using the response W received from the certificate authority side, and judging that the signature S is legal when $W=B^2$ holds or that the signature S is illegal otherwise, at the user side; and (c) receiving an encrypted random data from the user side, the encrypted random data being encrypted by the user using the public keys, decrypting the encrypted random data using the secret keys, and returning a decrypted random data to the user side, such that the user side checks if the decrypted random data coincides with an original random data to prove that the e-commerce/information service provider has authentic secret keys.

9. A method for enabling a user side to check authenticity of an e-commerce/information service provider, comprising the steps of, (a) issuing public keys (D, P, k, t), secret keys (D1, q), and a signature S for the public keys from a certificate authority side to the e-commerce/information service provider, the signature S being generated according to an undeniable digital signature scheme, wherein the step (a) further includes the steps of:

(a1) generating the public keys and the secret keys at the certificate authority side, by generating two p, q (p, q>4, p=3 mod 4, $$p, q\left(p, q > 4, p = 3 \bmod 4, \sqrt{\frac{p}{3}} < q\right),$$

computing D1=−p and D= D1q², obtaining a bit length k of $$\frac{\sqrt{|D1|}}{4}$$

and a bit length t of q−(D1/q) where (D1/q) denotes Kronecker symbol, and generating a kernel element P of a map from a class group Cl(D) to a class group Cl(D1); and (a2) generating the signature S for the public keys at the certificate authority side, by embedding the public keys into a message ideal M in the class group Cl(D) where a norm of the message ideal M is larger than k+1 bits, and mapping the message ideal M to the class group Cl(D1) and pulling the mapped message ideal M back to the class group Cl(D); and (b) verifying the signature S provided from the e-commerce/information service provider to the user side, at the certificate authority side interactively with the user side in order to prove authenticity of the public keys provided by the e-commerce/information service provider, wherein the step (b) further includes the steps of:

(b1) checking whether a norm N(S) of the signature S received from the certificate authority side is smaller than k bits or not, and judging that the signature S is illegal when the norm N(S) is larger than k bits, or generating a challenge C when the norm N(S) is not larger than k bits, by computing the message ideal M of the public keys, generating a random integer r smaller than t bits, computing $H=(M/S)^r$, generating a random ideal B whose norm is smaller than k−1 bits, and computing the challenge C=BH, at the user side;

(b2) computing a response W by mapping the challenge C received from the user side to the class group Cl(D1) and pulling the mapped challenge C back to the class group Cl(D) and squaring a result of mapping and pulling back, using the secret keys (D1, q), at the certificate authority side; and (b3) checking whether $W=B^2$ holds or not by using the response W received from the certificate authority side, and judging that the signature S is legal when $W=B^2$ holds or that the signature S is illegal otherwise, at the user side.

10. A method for enabling a user side to check authenticity of an e-commerce/information service provider, comprising the steps of:

(a) generating a signature S for a hash value of a home page of the e-commerce/information service provider at a certificate authority according to an undeniable digital signature scheme, wherein the step (a) further includes the steps of:

(a1) generating public keys (D, P, k, t) and secret keys (D1, q) at the certificate authority, by generating two primes p, q (p, q>4, p=3 mod 4, $$p, q\left(p, q > 4, p = 3 \bmod 4, \sqrt{\frac{p}{3}} < q\right),$$

computing D1=−p and D=D1q², obtaining a bit length k of $$\frac{\sqrt{|D1|}}{4}$$

and a bit length t of q−(D1/q) where (D1/q) denotes Kronecker symbol, and generating a kernel element P of a map from a class group Cl(D) to a class group Cl(D1); and (a2) generating the signature S for the hash value of the home page at the certificate authority, by embedding the hash value of the home page into a message ideal M in the class group Cl(D) where a norm of the message ideal M is larger than k+1 bits, and mapping the message ideal M to the class group Cl(D1) and pulling the mapped message ideal M back to the class group Cl(D);

(b) posting the signature on a display of the home page of the e-commerce/information service provider at a user side from the certificate authority side, such that the user side can initiate a process of verifying the signature by clicking the signature on the display; and (c) verifying the signature S at the certificate authority side interactively with the user side in order to prove authenticity of the e-commerce/information service provider, wherein the step (c) further includes the steps of:

(c1) checking whether a norm N(S) of the signature S received from the certificate authority side is smaller than k bits or not and judging that the signature S is illegal when the norm N(S) is larger than k bits, or generating a challenge C when the norm N(S) is not larger than k bits, by computing the message ideal M of the public keys, generating a random integer r smaller than t bits, computing $H=(M/S)^r$, generating a random ideal B whose norm is smaller than k−1 bits, and computing the challenge C=BH, at the user side;

(c2) computing a response W by mapping the challenge C received from the user side to the class group Cl(D1) and pulling the mapped challenge C back to the class group Cl(D) and squaring a result of mapping and pulling back, using the secret keys (D1, q), at the certificate authority side; and (c3) checking whether $W=B^2$ holds or not by using the response W received from the certificate authority side, and judging that the signature S is legal when $W=B^2$ holds or that the signature S is illegal otherwise, at the user side.

* * * * *